US009365279B2

(12) United States Patent
Joern

(10) Patent No.: US 9,365,279 B2
(45) Date of Patent: Jun. 14, 2016

(54) FUSELAGE OF AN AIRCRAFT OR SPACECRAFT AND METHOD OF ACTIVELY INSULATING SUCH A FUSELAGE

(75) Inventor: Paul Joern, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1343 days.

(21) Appl. No.: 12/528,384

(22) PCT Filed: Feb. 21, 2008

(86) PCT No.: PCT/EP2008/052120
§ 371 (c)(1),
(2), (4) Date: Sep. 27, 2010

(87) PCT Pub. No.: WO2008/101986
PCT Pub. Date: Aug. 28, 2008

(65) Prior Publication Data
US 2011/0009042 A1 Jan. 13, 2011

Related U.S. Application Data

(60) Provisional application No. 60/903,033, filed on Feb. 23, 2007, provisional application No. 60/903,034, filed on Feb. 23, 2007.

(30) Foreign Application Priority Data

Feb. 23, 2007 (DE) .......................... 10 2007 008 986
Feb. 23, 2007 (DE) .......................... 10 2007 008 987

(51) Int. Cl.
*B64D 13/00* (2006.01)
*B64C 1/06* (2006.01)

(52) U.S. Cl.
CPC ................ *B64C 1/067* (2013.01); *B64D 13/00* (2013.01); *Y02T 50/44* (2013.01); *Y02T 50/46* (2013.01)

(58) Field of Classification Search
USPC ........................................... 454/76
See application file for complete search history.

(56) References Cited

U.S. PATENT DOCUMENTS 2,427,698 A * 9/1947 Arnhym ..................... 454/185
2,755,638 A * 7/1956 Sevin ........................... 62/402
(Continued)

FOREIGN PATENT DOCUMENTS

DE 10154063 A1 5/2003
JP 2002-249099 9/2002
(Continued)

OTHER PUBLICATIONS

Chinese Office Action for Application Serial No. 200880005827.4 dated as early as May 2012.
(Continued)

*Primary Examiner* — Gregory Huson
*Assistant Examiner* — Dana Tighe
(74) *Attorney, Agent, or Firm* — Jenkins, Wilson, Taylor & Hunt, P.A.

(57) ABSTRACT

The present invention relates to a fuselage of an aircraft or spacecraft, with at least one shell element and a structural element. An interspace to which air can be admitted by an air stream is provided between the at least one shell element and the structural element. The fuselage is distinguished by the fact that, to form the air-admitting air stream as an outgoing/incoming air stream of a pressurized interior space of the fuselage, the interspace is connected to a corresponding outgoing/incoming air connection of the interior space. The invention also relates to a corresponding aircraft or spacecraft and to a method of actively insulating such a fuselage.

12 Claims, 9 Drawing Sheets

(56) References Cited

U.S. PATENT DOCUMENTS

| | | | |
|---|---|---|---|
| 2,912,724 A * | 11/1959 | Wilkes | 52/302.3 |
| 3,369,777 A * | 2/1968 | Furlong | 244/59 |
| 3,483,711 A * | 12/1969 | Malczewski | 62/91 |
| 3,740,905 A * | 6/1973 | Adams | 52/404.3 |
| 4,291,851 A * | 9/1981 | Johnson | 244/119 |
| 4,393,633 A * | 7/1983 | Charniga | 52/302.3 |
| 5,386,952 A * | 2/1995 | Nordstrom et al. | 244/118.1 |
| 5,577,688 A * | 11/1996 | Sloan | 244/117 R |
| 5,779,193 A * | 7/1998 | Sloan | 244/117 R |
| 5,897,079 A * | 4/1999 | Specht et al. | 244/118.5 |
| 6,491,254 B1 * | 12/2002 | Walkinshaw et al. | 244/118.5 |
| 6,951,162 B1 * | 10/2005 | Shockey et al. | 89/36.11 |
| 7,005,175 B2 * | 2/2006 | Hachenberg et al. | 428/75 |
| 8,245,974 B2 * | 8/2012 | Paul | 244/129.1 |
| 2003/0087049 A1 * | 5/2003 | Hachenberg et al. | 428/34.1 |
| 2003/0126806 A1 * | 7/2003 | Ellis | 52/95 |
| 2005/0044712 A1 * | 3/2005 | Gideon et al. | 29/897.32 |
| 2009/0189018 A1 * | 7/2009 | Dittmar et al. | 244/121 |

FOREIGN PATENT DOCUMENTS

| | | |
|---|---|---|
| JP | 2003-191897 | 7/2003 |
| SU | 183593 | 6/1966 |
| WO | WO 00/37313 | 6/2000 |
| WO | WO 2005/095206 | 10/2005 |

OTHER PUBLICATIONS

German Office Action for DE 10 2007 008 986 dated Oct. 30, 2008.
German Office Action for DE 10 2007 008 987 dated Oct. 30, 2008.
International Search Report for PCT/EP/2008/052120 dated May 27, 2008.
Russian Decision to Grant for Serial No. 2009133828/11 dated Jun. 14, 2012.

* cited by examiner ern patent application No. 10 2007 008 986.6, filed Feb. 23, 2007, and German patent application No. 10 2007 008 987.4, filed Feb. 23, 2007, the entire disclosures of which are herein incorporated by reference.

FUSELAGE OF AN AIRCRAFT OR SPACECRAFT AND METHOD OF ACTIVELY INSULATING SUCH A FUSELAGE

CROSS-REFERENCE TO RELATED APPLICATIONS

This application claims the benefit of U.S. Provisional Application No. 60/903,033, filed Feb. 23, 2007, U.S. Provisional Application No. 60/903,034, filed Feb. 23, 2007, German patent application No. 10 2007 008 986.6, filed Feb. 23, 2007, and German patent application No. 10 2007 008 987.4, filed Feb. 23, 2007, the entire disclosures of which are herein incorporated by reference.

TECHNICAL FIELD

The present invention relates to a fuselage of an aircraft or spacecraft and to an aircraft or spacecraft with such a fuselage and to a method of actively insulating such a fuselage.

BACKGROUND

Such fuselages are made up of a number of components. An aircraft or spacecraft, such as for example an aeroplane, is not only exposed to great load changes and stresses but also considerable temperature differences during operation. For example, at a specific cruising altitude, the outside temperature on the outer side of the fuselage is approximately −55° C., while the inside temperature in the area of the pressurized cabins is kept at a value of approximately +20° C. This is performed by means of an air-conditioning system. In the case of conventional aircraft fuselages, the inner side of the fuselage is provided with a thermal insulation, which also forms an acoustic insulation.

A fuselage may be of a single- or multi-shell form, in particular a double-shell form.

FIG. 7 illustrates a partial sectional view of a single-shell fuselage 1 based on a technique known to the applicant with a shell element 2, which has stiffenings 15, for example so-called stringers, on its inner side. The conventional construction of an insulation 18 comprises insulating layers, which usually consist of glass wool and are integrated in an enclosure 17, for example a film of plastic, between the inner side of the shell element 2 and an inner structural element 7, for example a lining of the cabin. The lining is produced for example from a GRP material. It may also have side panels 16. This arrangement performs the functions of thermal insulation and sound insulation of an interior space 20 with respect to an outer side 19 outside the fuselage 1.

However, the additional weight of the insulation, its space requirement and the consequently necessary installation requirement are considered to be disadvantageous here. Furthermore, with this arrangement, an accumulation of condensation can lead to increased weight and a risk of corrosion, which means that a corresponding amount of maintenance work is required. The elimination of accumulations of moisture by drying or exchanging the insulation 18 along with the enclosure 17 is disadvantageously necessary.

Therefore, concepts for a fuselage of a double-shell type of construction have been proposed, as described in DE 101 54 063. FIG. 8 shows in this respect a partial sectional view of a portion of a prior-art double-shell fuselage 1, which is produced for example from fibre reinforced materials.

The shell element 2 of the fuselage 1 has an outer shell element 3 and an inner shell element 4, which are arranged at a distance from each other and form a core interspace 5. The core interspace 5 is provided with a core structure 6, which comprises for example a folded honeycomb structure of GRP, carbon fibre reinforced plastics or the like, forms a shear-resistant laminate that is effective in terms of structure mechanics (sandwich structure) and stabilizes the fuselage structure. At the same time, the core structure 6 has a thermal and acoustic insulation and, by its compactness, increases the interior space of the cabin.

Air can be admitted to the core interspace 5 by means of an air stream 10, which is indicated by arrows, whereby so-called moisture management is possible with respect to condensation in the core interspace 5. The inner shell element 4 faces with its inner side towards the interior space 20, where the lining, for example a decorative film, is arranged on it.

A disadvantage here is that further additional insulating work is required, since otherwise the aim of an inner wall temperature that can be fixed, for example at +20° C., cannot be achieved.

FIG. 9 illustrates a customary system of pipes 12a of an air-conditioning system (not shown) of an aeroplane. A portion of a fuselage 1a with a lateral portion of the system of pipes 12a is presented in a simplified form, given by way of example. A system of coordinates indicates a longitudinal direction x, a transverse direction y and a vertical direction z of the aeroplane for orientation. In the x direction, there extends a lower X line 13a and an upper X line 14a, which are connected by means of Z lines 15a running substantially in the z direction. Indicated in the middle are two further intermediate lines 16a, running in the x direction. The air-conditioning system (not shown) is connected to this system of pipes 12a and controls the ventilation and temperature of the cabin, also maintaining the internal cabin pressure. Furthermore, the air-conditioning system is also used for ventilating and cooling areas outside the cabin, such as for example a cargo hold, avionics rack, etc. The air-conditioning system feeds the system of pipes 12a, which is designed as a compressed-air system and is routed throughout the entire aeroplane. Warm air is passed from the bottom upwards from the lower X lines 13a via the Z lines 15a into the upper X lines 14a and intermediate lines 16a and into the cabin. The Z lines 15a run behind a cabin lining.

Such supply lines may have the following disadvantages. Depending on the cross section, a relatively great installation space is required. The lines are of a certain weight, which adds to the weight of the aeroplane. Such a system of pipes requires a certain amount of installation work. Furthermore, the lines can be easily damaged, since they have only small wall thicknesses.

SUMMARY

Against this background, the present invention is based on the object of providing a fuselage, an aircraft or spacecraft and a method of active insulation that no longer have the aforementioned disadvantages.

This object is achieved according to the invention by a fuselage with the features of Patent claim 1 or 12 and/or an aircraft or spacecraft with the features of Patent claim 10 or 20 and/or a method with the features of Patent claim 11.

Accordingly provided is a fuselage of an aircraft or spacecraft, with at least one shell element and a structural element, between which there is an interspace to which air can be admitted by an air stream. The air stream admitting air to the interspace is formed as an outgoing/incoming air stream of a pressurized interior space, for example a cabin, of the fuselage. The interspace is therefore connected to a corresponding outgoing/incoming air connection of the interior space.

This provides the advantage of an enhanced, or at least maintained, insulating effect by means of the interspace being flowed through by the air stream from a pressurized interior space of the fuselage. This air stream is usually let out to the atmosphere surrounding the aeroplane. During operation, such an air stream flows for example permanently from the pressurized cabin via a so-called outflow regulating valve into the atmosphere surrounding the aircraft. The air stream supplied to the interior space is already heated to a certain temperature for example by an air-conditioning system present in an aircraft. Additional heat exchangers are not necessary, but may be provided.

A further advantage here is that the forced air flow is produced by the equipment making up the air-conditioning system and no additional energy has to be used for this active insulation/ventilation.

There is a lower space requirement for the insulation in comparison with the prior art, since the admission of the air stream to the interspace of the fuselage constitutes active insulation, which leads to a reduction in the insulating thicknesses of customary installations. Furthermore, the weight is likewise reduced in comparison with the prior art. This also leads to a lower weight and increased interior space in the cabin.

The amount of insulation work is also reduced by eliminating or reducing insulation.

In the ventilated area there is also the advantage of a reduction in the condensation points or at least reduced accumulations of water as a result of condensation.

Also provided is a fuselage of an aircraft or spacecraft with at least one shell element and a structural element, between which there is an interspace to which air can be admitted by an air stream. The interspace forms at least a portion of a system of pipes of an air-conditioning system.

Consequently, the advantage of an enhanced, or at least maintained, insulating effect is also obtained here by means of the interspace being flowed through by the heated air stream of the air-conditioning system. Since this interspace forms a part or portion of the system of pipes of the air-conditioning system, it dispenses with the need for the otherwise customary Z lines 15a, since the interspace extends in the z direction, as indicated by the explanation above in relation to FIG. 8. Portions of the X lines 13a, 14a may also be integrated, so that a particularly advantageous weight saving is obtained by reducing the number of these parts.

These concepts are possible in the case of a single-shell fuselage as described above and also in the case of a multi-shell shell element with an outer shell element and an inner shell element. Here, the interspace to which air can be admitted by the air stream is provided between the inner shell element and the structural element. The interspace may, however, also be provided in such a way that air can be admitted between the shell elements, the structure of which comprises for example a sandwich type of construction with any core materials and panel materials and with or without additional insulation. The shell elements may be formed from metal, fibre composite materials or a combination of metal with fibre composite materials.

Advantageous refinements and improvements of the present invention can be found in the subclaims.

The air stream for admitting air or for active insulation may be adjusted and controlled by means of a valve, for example a regulating valve. This valve may be arranged at the inlet to the interspace, inside it or at its outlet. It is of course also possible for a number of valves to be present.

It is particularly advantageous in this respect for it to be possible for an internal pressure of the pressurized interior space to be at least partially regulated by means of the at least one valve.

An additional insulation may be fitted on the fuselage described, such as for example a lining with insulating properties. Improved efficiency of the active insulation is obtained as a result. A further advantage in this case is improved acoustic insulation.

It is also possible to fit an insulating element in the interspace on the shell element. On account of the active insulation, however, significantly smaller insulating material thicknesses than in the prior art are required. As a result, improved efficiency of the overall thermal insulation is obtained. A further advantage in this case is improved acoustic insulation.

Also provided is an aircraft or spacecraft that is formed with a fuselage described above.

A corresponding method of actively insulating a fuselage described above of an aircraft or spacecraft is distinguished by the fact that the active insulation is carried out with an air stream which is an outgoing/incoming air stream of a pressurized interior space of the fuselage.

BRIEF DESCRIPTION OF THE DRAWINGS

The invention is explained in more detail below on the basis of the exemplary embodiment represented in the schematic figures of the drawing, in which:

FIG. 9 shows a schematic partial view of a portion of a fuselage with a system of pipes of an air-conditioning system according to the prior art.

DETAILED DESCRIPTION OF THE DRAWINGS

Figure 1:
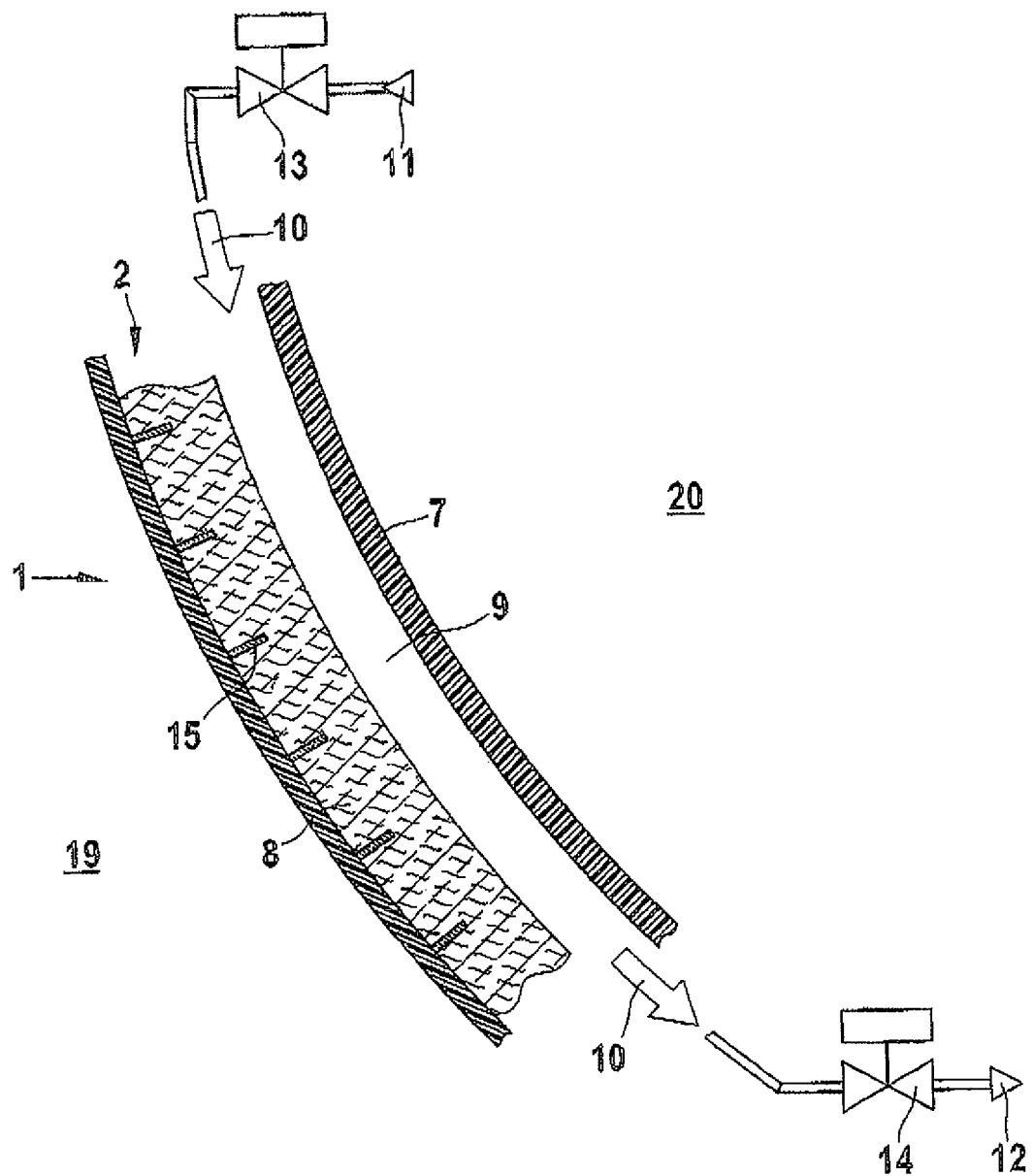
FIG. 1 shows a partial sectional view of a portion of an exemplary embodiment of a fuselage according to the invention.

In all the figures of the drawing, elements that are the same or functionally the same have in each case the same reference numerals, unless otherwise indicated.

Figure 7:
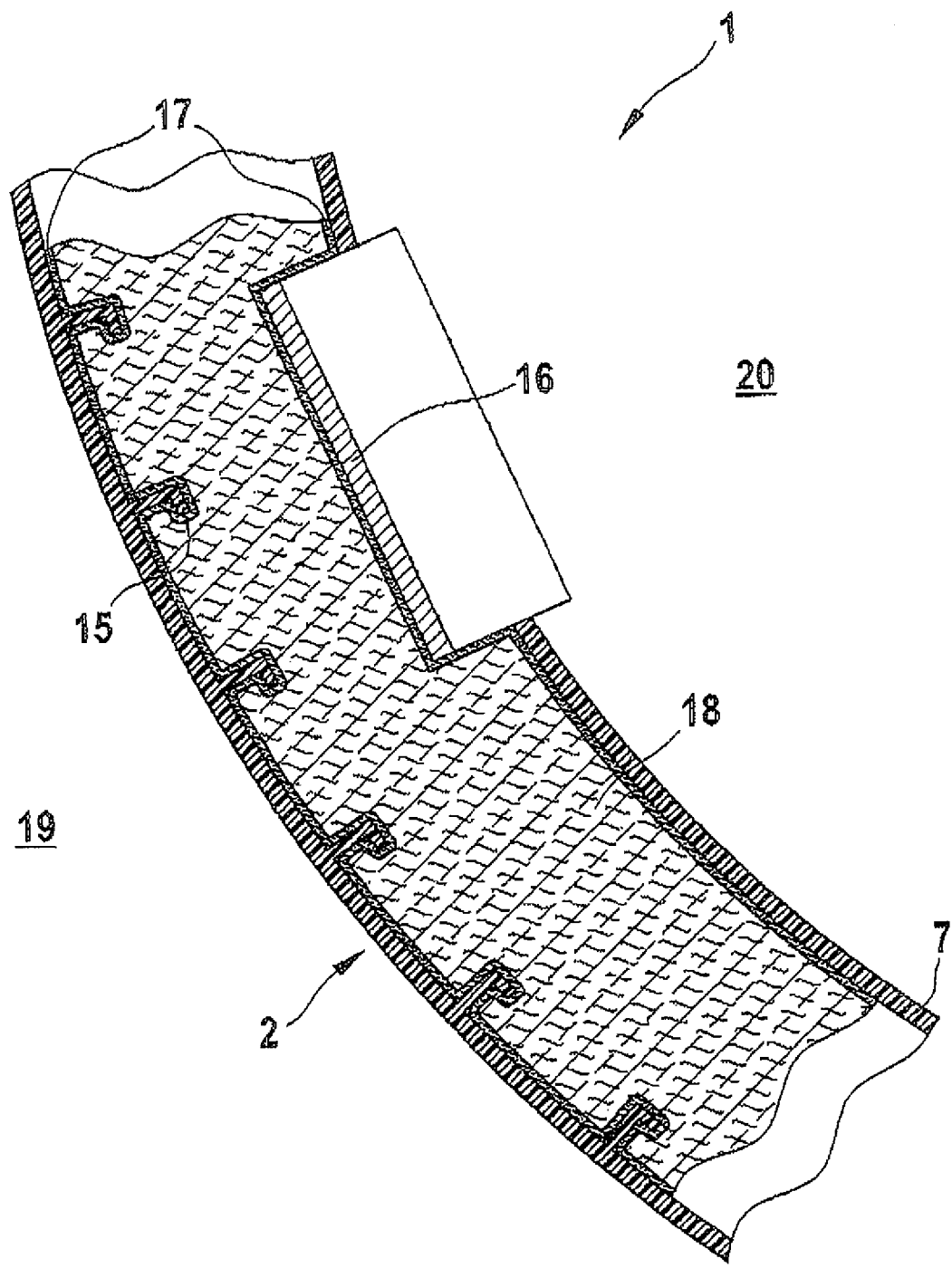
FIG. 7 shows a partial sectional view of a portion of a single-shell fuselage according to the prior art.
Figure 8:
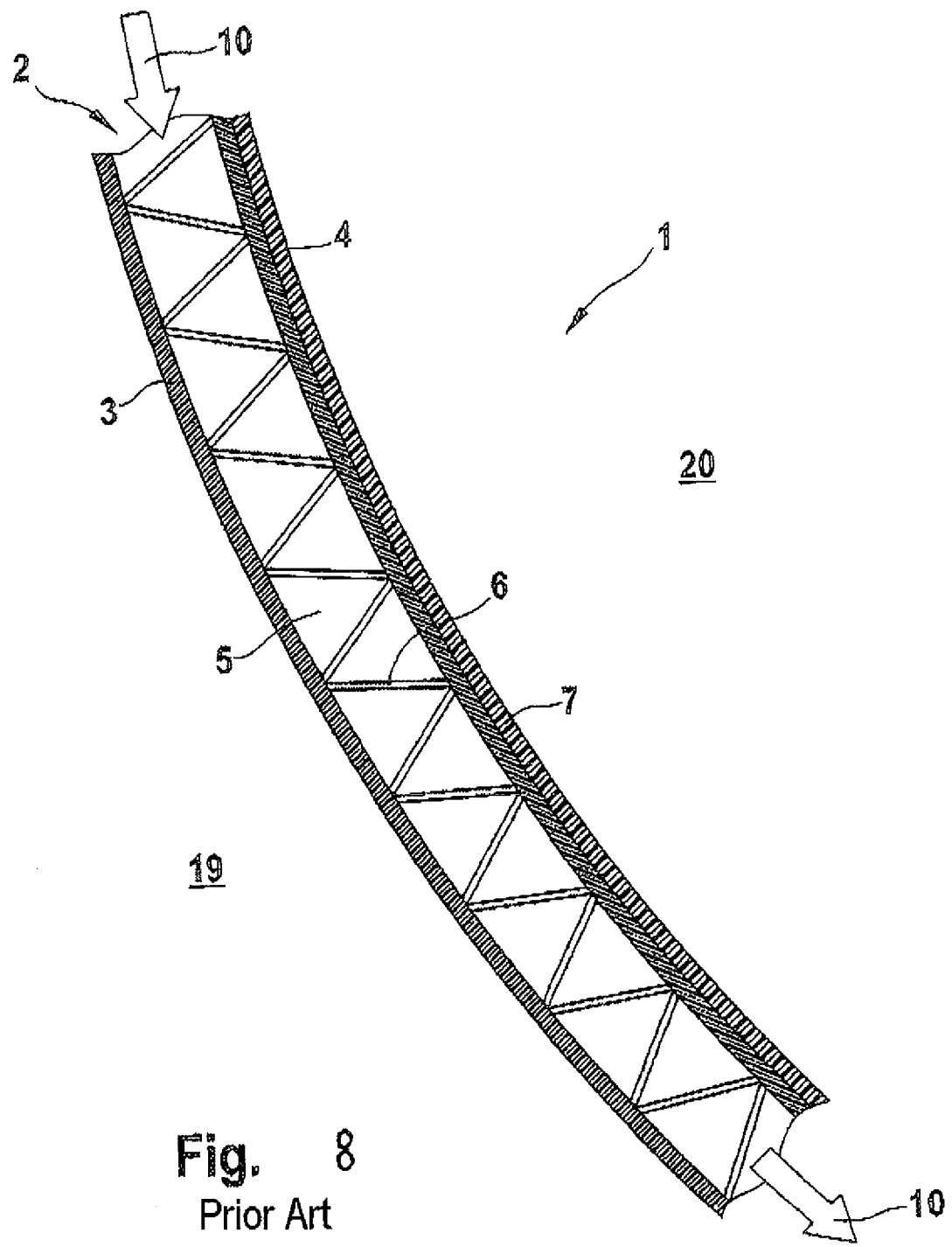
FIG. 8 shows a partial sectional view of a portion of a double-shell fuselage according to the prior art.
Figure 3:
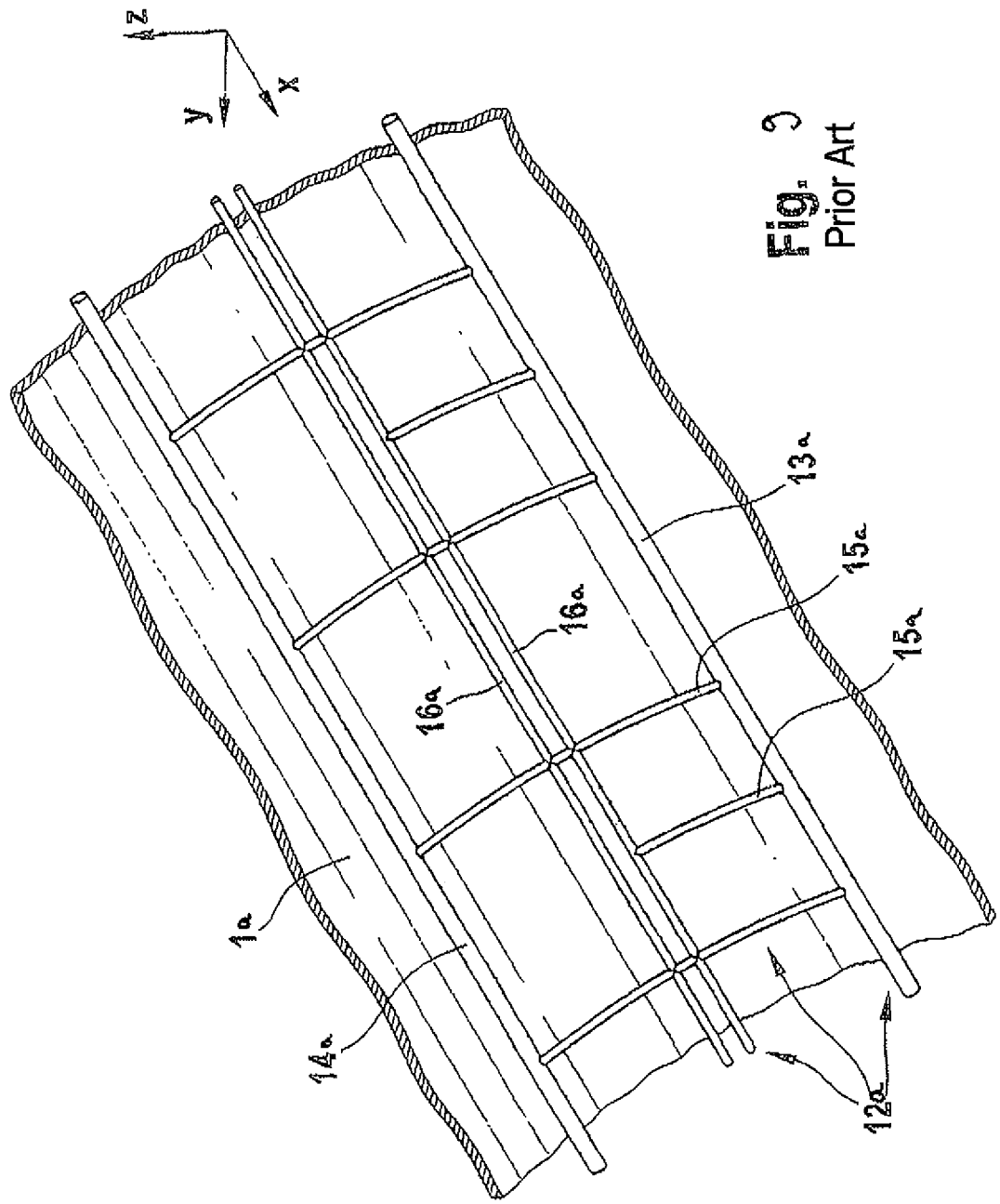

The prior art shown in FIGS. 7 to 9 has already been explained above.

FIG. 1 shows a partial sectional view of a portion of a first exemplary embodiment of a fuselage 1 according to the invention of a single-shell configuration. The fuselage 1 is in this example a fuselage of an aircraft or spacecraft, for example an aeroplane, which is not represented.

According to an exemplary embodiment, a shell element 2 on the left side in the figure is in connection with an outer side 19, for example the air. With respect to the inner side of the shell element 2, the latter is reinforced for example by stiffenings 15 in the longitudinal direction (perpendicular to the plane of the drawing) and provided with an insulating element 8, which has a certain thickness and is for example adhesively bonded on the inner side of the shell element 2.

Further in the direction of an interior space 20 of the fuselage 1 there is a structural element 7, for example a lining of a cabin, arranged at a distance from the insulating element 8, whereby an interspace 9 is formed.

Air can be admitted to this interspace 9 by an air stream 10, which is indicated by arrows. It may also run in the opposite direction. Instead of flowing out through a so-called outflow regulating valve, in this example the air stream 10 flows as outgoing air out of the pressurized cabin of the aircraft or spacecraft through an inlet 11, passes an inlet valve 13 and flows into the interspace 9, which is only indicated here by way of example. The inlet valve 13 could be, for example, the outflow regulating valve or such a modified valve. A number of these interspaces may be present in the aircraft. The air stream 10 may analogously also be formed as an incoming air stream to a pressurized interior space of the fuselage 1.

The air stream 10 has been heated for example by an air-conditioning system for the cabin and gives off its residual heat to the surfaces of the interspace 9, whereby an active insulation takes place. A heat transfer resistance of the fuselage 1 from the interior space 20 to the outer side 19 is consequently increased. The energy introduced into the air stream 10 is consequently not given off to the outer side 19 by being let out, but is advantageously used for active insulation, whereby the energy requirement for the air-conditioning system is also reduced.

Only once its energy has been given off for active insulation does the air stream 10 flow on via an outlet for further use or disposal. Either an inlet valve or an outlet valve 14 is provided. It is also conceivable for it to be arranged inside the interspace 9. In this example, a combination of two valves 13, 14 is shown. It goes without saying that a number of valves 13 in parallel connection is also possible.

The internal cabin pressure can be adjusted or regulated by means of the valve 13; 14. For this purpose, the valve 13; 14 is formed as a regulating valve, for example for systems of pipes of air-conditioning systems. The associated control arrangement is not shown, but may also be used for adjusting and regulating the air stream 10. The air stream 10 may also be a partial stream of the overall outgoing air stream of the cabin. It is also conceivable for the incoming air stream to the cabin to be used completely or partially for this purpose. A combination is also conceivable, it being possible for a number of interspaces 9 to be subjected to the outgoing air stream and a number to be subjected to the incoming air stream.

Figure 2:
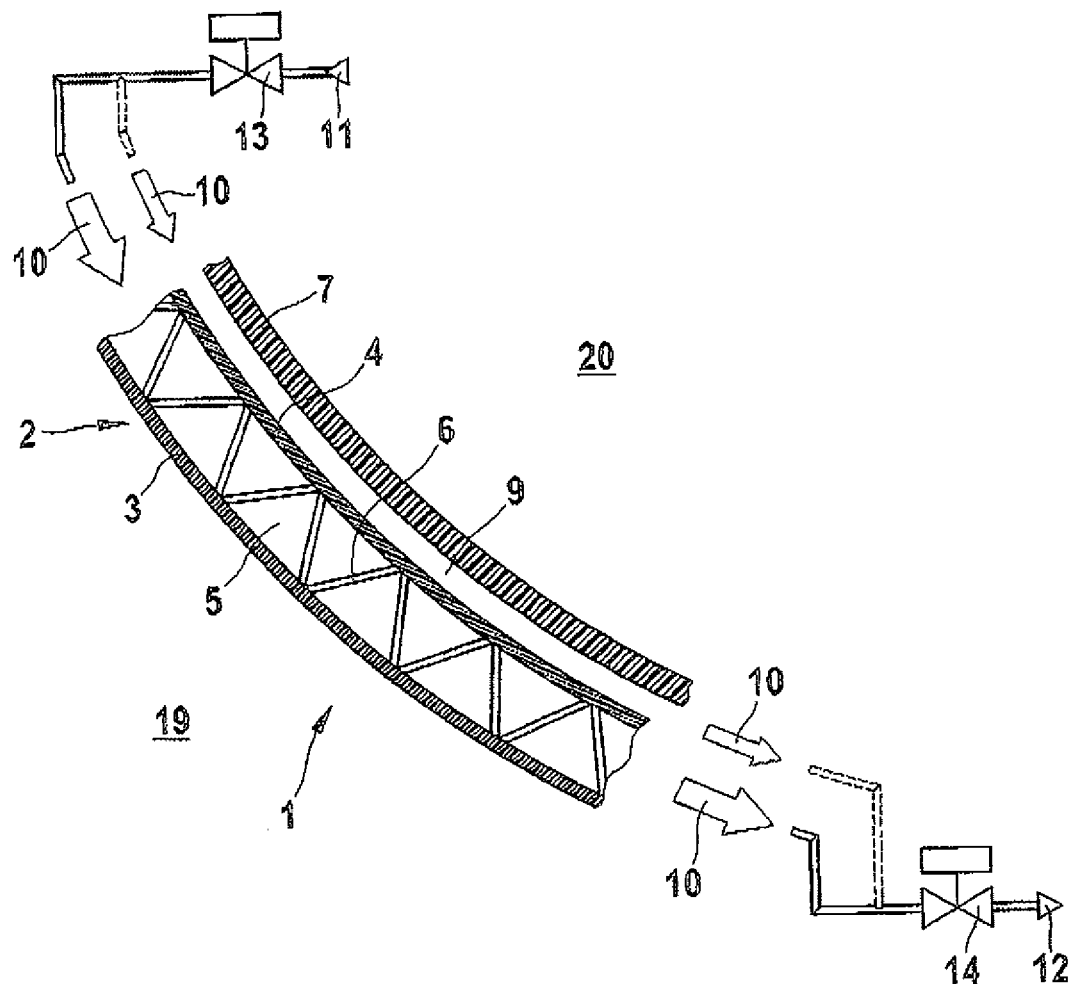
FIG. 2 shows a partial sectional view of a portion of a further exemplary embodiment of a fuselage according to the invention.

In FIG. 2, a second exemplary embodiment of the fuselage 1 according to the invention is shown in a multi-shell, in particular double-shell, configuration.

The multi-shell configuration of the fuselage 1 is constructed in this example with a double-shell shell element 2. An outer shell element 3 is arranged with one side towards the outer side 19 of the aircraft, which is not represented. Its opposite side is arranged at a distance from a side of an inner shell element 4, forming a core interspace 5, in which a core structure 6 is arranged. The core structure 6 connects the outer shell element 3 to the inner shell element 4 with nonpositive engagement and has a insulating property for the thermal and acoustic insulation with respect to the interior space 20. The core structure 6 is permeable, that is to say air can be admitted to the core interspace 5.

An inner side of the shell element 2 faces the interior space 20, in this example an inner side of the inner shell element 4. In the direction of the interior space 20, the structural element 7 is arranged at a distance from the inner shell element 4 and forms with the inner shell element 4 the interspace 9 to which air can be admitted.

In this example, the core interspace 5 and the interspace 9 are flowed through by the air stream 10 or partial streams (dashed lines in the case of the second, smaller arrows) of it. The air stream is heated in the way described above and gives off its energy to the core interspace 5 and the interspace 9, forming an active insulation.

In addition, here the air stream also flows through the interspace 9. It may be possible in this case that the structural element 7 also has an insulating effect, so that a particularly advantageous combination of active insulation by means of the air stream 10 and passive insulation of the structural element 7 can be achieved.

The function of the valves 13; 14 is as described with respect to FIG. 1. In this example shown in FIG. 2, a valve 13; 14 may be respectively used for each interspace 5, 9.

It is also possible that only the core interspace 5 is subjected to the air stream 10.

Figure 3:
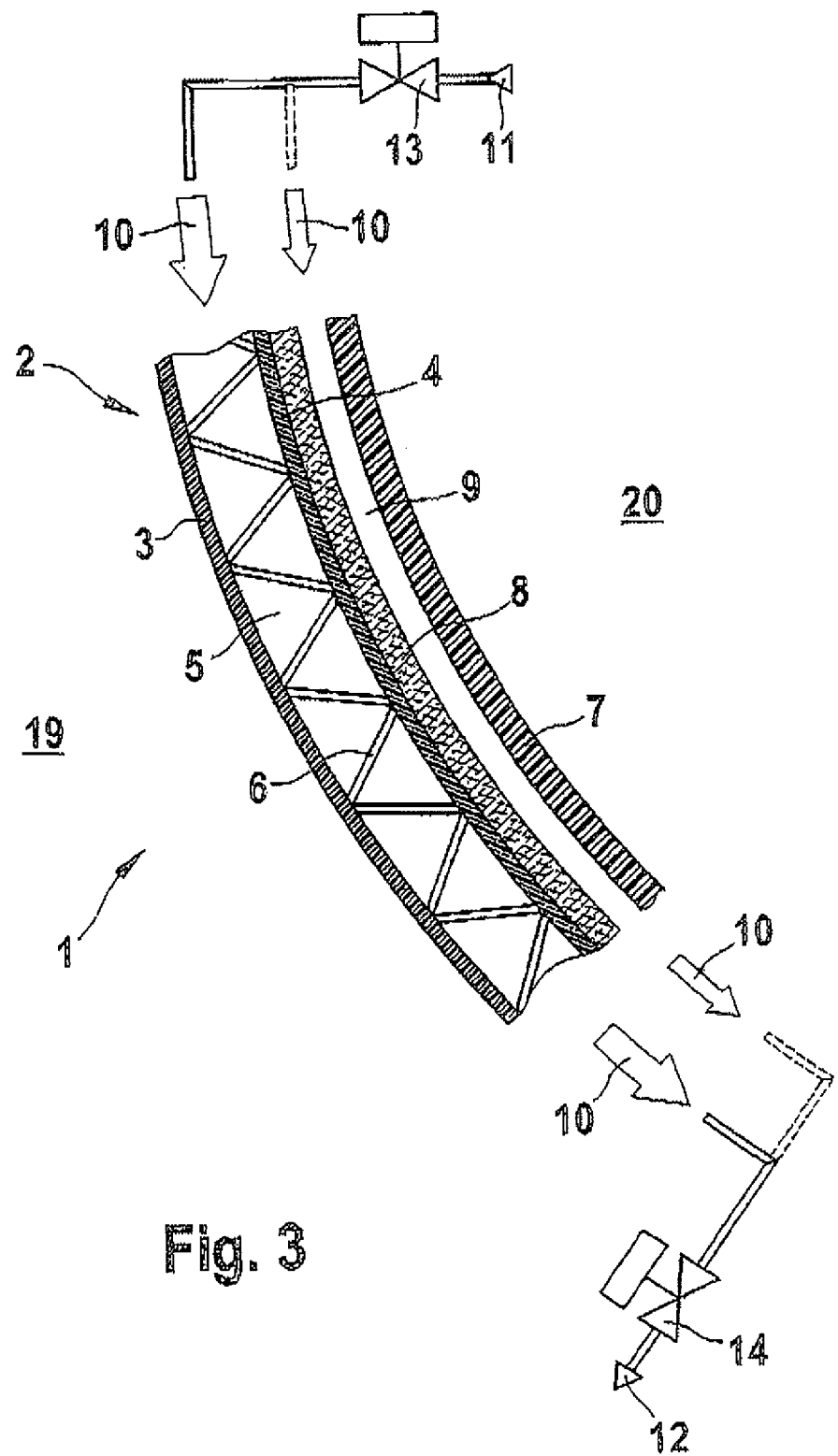
FIG. 3 shows a partial sectional view of a portion of a further exemplary embodiment of a fuselage according to the invention.

FIG. 3 shows an exemplary embodiment of the fuselage 1 according to the invention, which differs from the exemplary embodiment according to FIG. 2 only in that an insulating element 8 has been applied to the inner side of the inner shell element 4 in the interspace 9. In this arrangement, given by way of example, the insulating element in this way forms a passive insulation in combination with the active insulation by means of the air stream 10. Here, too, the function of the valves 13; 14 is as described above.

The inlet 11 is connected by a known installation technique for systems of pipes of air-conditioning systems to an already present outgoing/incoming air connection of a ventilated interior space 20. This and the connection between the valve 13; 14 and the interspaces 5 and 9 involves using arrangements of lines formed in the known way for ventilation and air-conditioning systems in aircraft to establish the respective connections. For example, a common pipeline, for example of a rectangular or circular cross section, may be laid from the valve 13 as a manifold from which connections are connected as branches for each interspace or for groups of interspaces. These connections may be designed for example in such a way that they are adapted in a suitable way from the cross section of the manifold to the cross section of the opening into the respective interspace. Connections to the outlet 12 are formed in an analogous way.

In the case of the embodiment in which the regulating valve is arranged inside the interspace 5; 9, the regulating valve may likewise be correspondingly formed for ventilation and air-conditioning lines for aircraft. Here it is possible for example that corresponding portions of a connection are provided for ducting air between portions of the respective interspace 5; 9. The sides of the shell elements that bound the respective interspace may also be designed for example with corresponding ducts, such that they form the air duct and connection of the portions of the interspace to a regulating valve. Such ducts can also increase the heat exchange between the air stream and the interspace for the active insulation.

Figure 4:
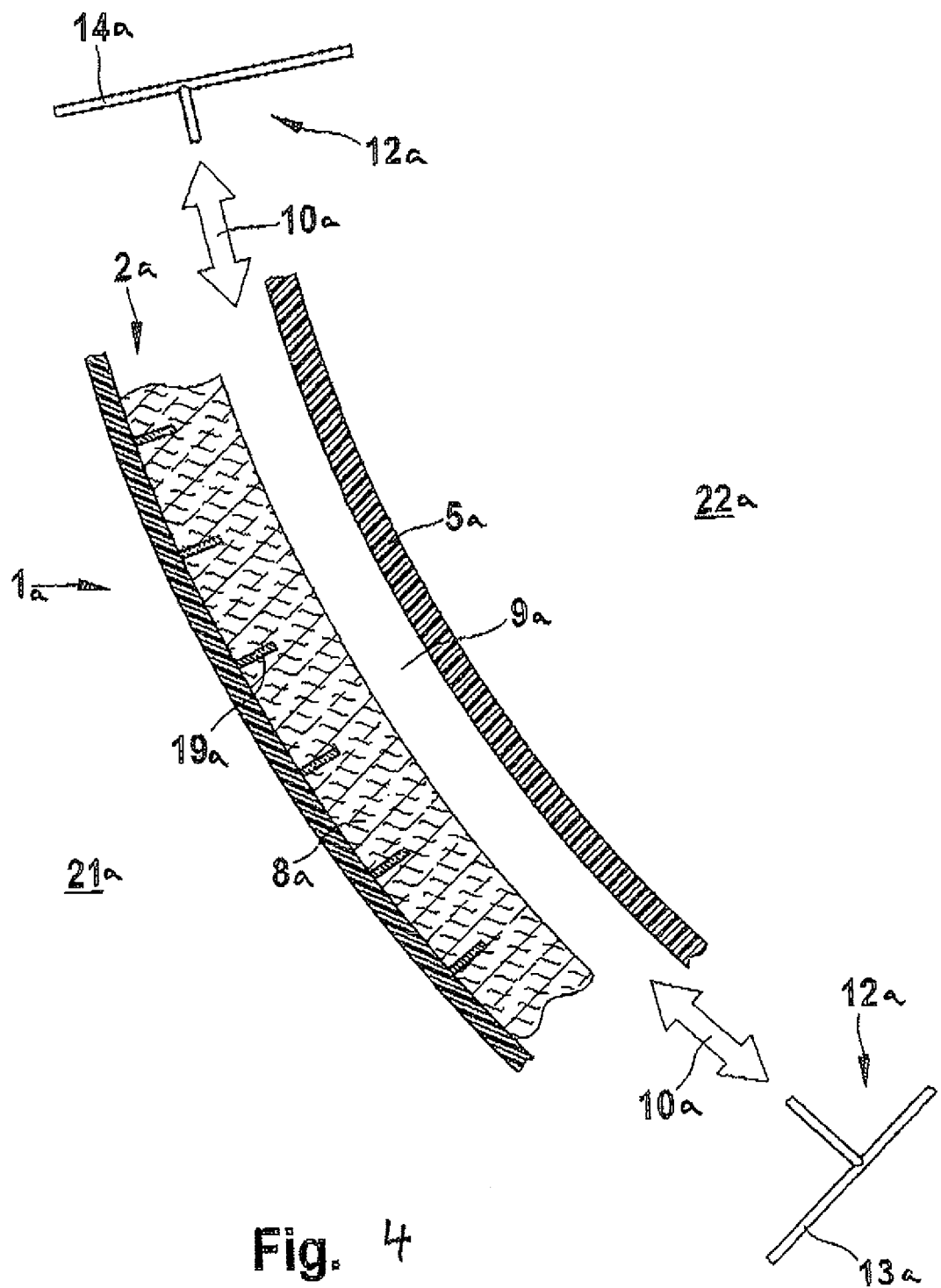
FIG. 4 shows a partial sectional view of a portion of a further exemplary embodiment of a fuselage according to the invention.

FIG. 4 shows a partial sectional view of a portion of a further exemplary embodiment of a fuselage 1a according to the invention in a single-shell configuration. The fuselage 1a is in this example a fuselage of an aircraft, such as for example an aeroplane, which is not represented.

On the left side in the figure, a shell element 2a is in connection with an outer side 21a of the aircraft. Towards the inner side of the shell element 2a, it is reinforced by stiffenings 19a in the longitudinal direction (perpendicular to the plane of the drawing) and provided with an insulating element 8a, which has a certain thickness and is attached on the inner side of the shell element 2a.

In addition, a structural element 5a, for example a lining of a cabin, is arranged at a distance from the insulating element 8a, whereby an interspace 9a is formed. A number of these interspaces may be present in the aircraft.

Air can be admitted to this interspace 9a by an air stream 10a, which is indicated by arrows. The interspace 9a is connected to a lower X line 13a and an upper X line 14a of the system of pipes 12a, represented in FIG. 6, of the air-conditioning system of the aeroplane. The interspace 9a consequently forms a portion of the system of pipes 12a, in that it forms the Z lines 15a (see FIG. 9) either completely or in the form of portions.

For example, the air stream 10a carries heated air out of the lower X line 13a and gives off its residual heat to the surfaces of the interspace 9a, whereby an active insulation is formed. A heat transfer resistance of the fuselage 1a from the interior space 22a to the outer side 21a is consequently increased. The energy introduced into the air stream 10a is advantageously used for the active insulation, whereby the energy requirement for the air-conditioning system can also be reduced.

Only once it has given off its energy for the active insulation does the stream 10a flow into the upper X line 14a or the intermediate line 16a (see FIG. 9).

The X line 13a and/or the X line 14a may also be integrated, for example in the form of portions, in the interspaces 9a, whereby the number of parts of the system of pipes 12a and its weight are reduced.

Figure 5:
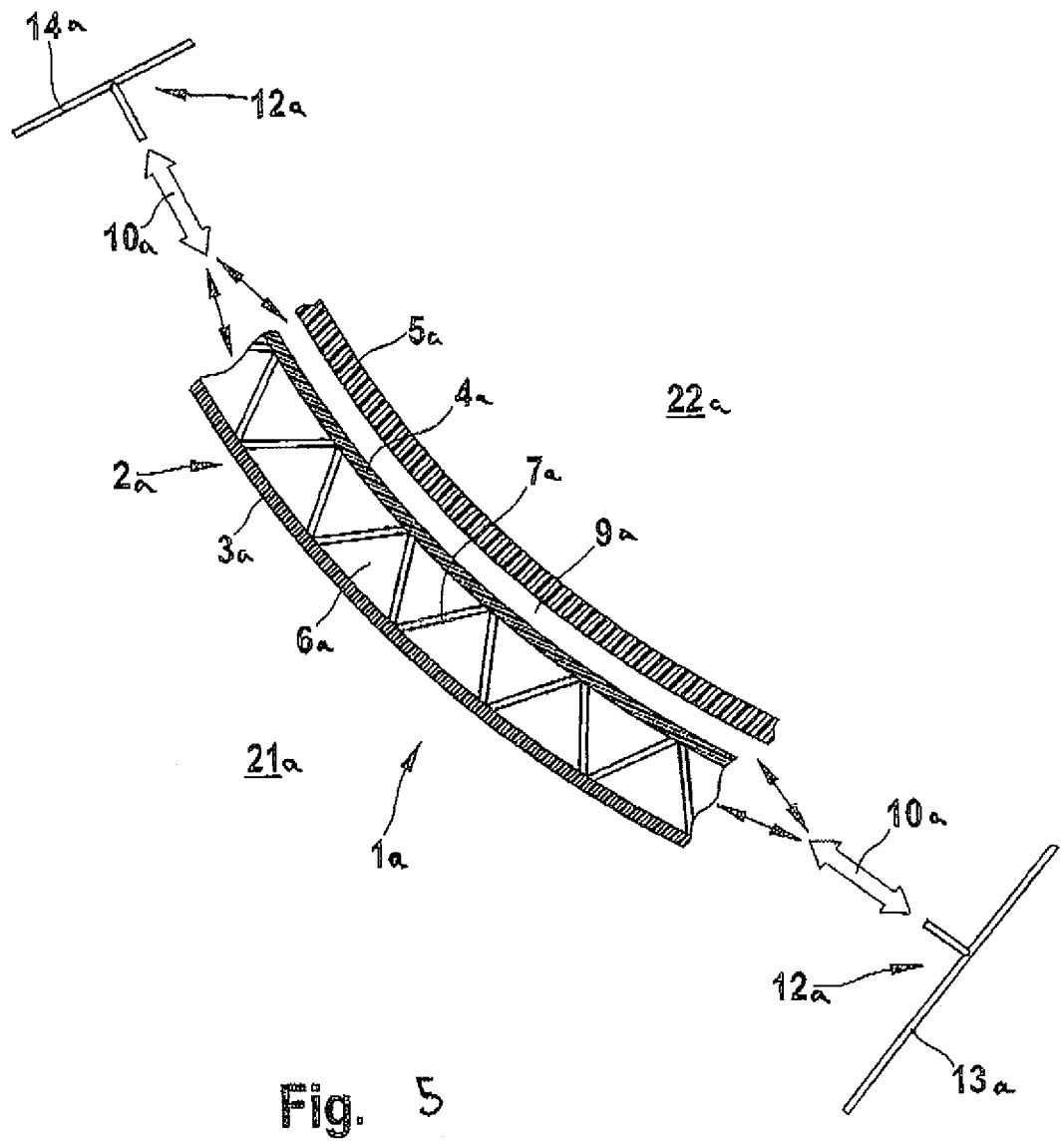
FIG. 5 shows a partial sectional view of a portion of a further exemplary embodiment of a fuselage according to the invention.

In FIG. 5, a further exemplary embodiment of the fuselage 1a according to the invention is shown in a multi-shell, in particular double-shell, configuration.

The multi-shell configuration of the fuselage 1a is constructed in this example with a double-shell shell element 2a. An outer shell element 3a is arranged with one side towards the outer side 21a of the aircraft, which is not represented. Its opposite side is arranged at a distance from a side of an inner shell element 4a, forming a core interspace 6a, in which a core structure 7a is arranged. The core structure 7a connects the outer shell element 3a to the inner shell element 4a with nonpositive engagement and has a insulating property for the thermal and acoustic insulation with respect to the interior space 22a. The core structure 7a is permeable, that is to say air can be admitted to the core interspace 6a.

An inner side of the shell element 2a faces the interior space 22a, in this example an inner side of the inner shell element 4a. In the direction of the interior space 22a, the structural element 5a is arranged at a distance from the inner shell element 4a and forms with the inner shell element 4a the interspace 9a to which air can be admitted.

In this example, the core interspace 5a and the interspace 9a are flowed through by the air stream 10a or partial streams (smaller arrows) of it. The air stream 10a is heated in the way described above and gives off its energy to the core interspace 6a and the interspace 9a, forming an active insulation.

In addition, here the air stream 10a also flows through the interspace 9a. It may be possible in this case that the structural element 5a also has an insulating effect, so that a particularly advantageous combination of active insulation by means of the air stream 10a and passive insulation of the structural element 5a can be achieved.

The interspace 9a and the core interspace 6a are connected to the system of pipes 12a of the air-conditioning system, as described with respect to FIG. 4, and form portions of the same. In this example shown in FIG. 5, it is of course also possible for only the interspace 9a or the core interspace 6a to be connected by itself to the system of pipes 12a for the integration of portions of the same.

Figure 6:
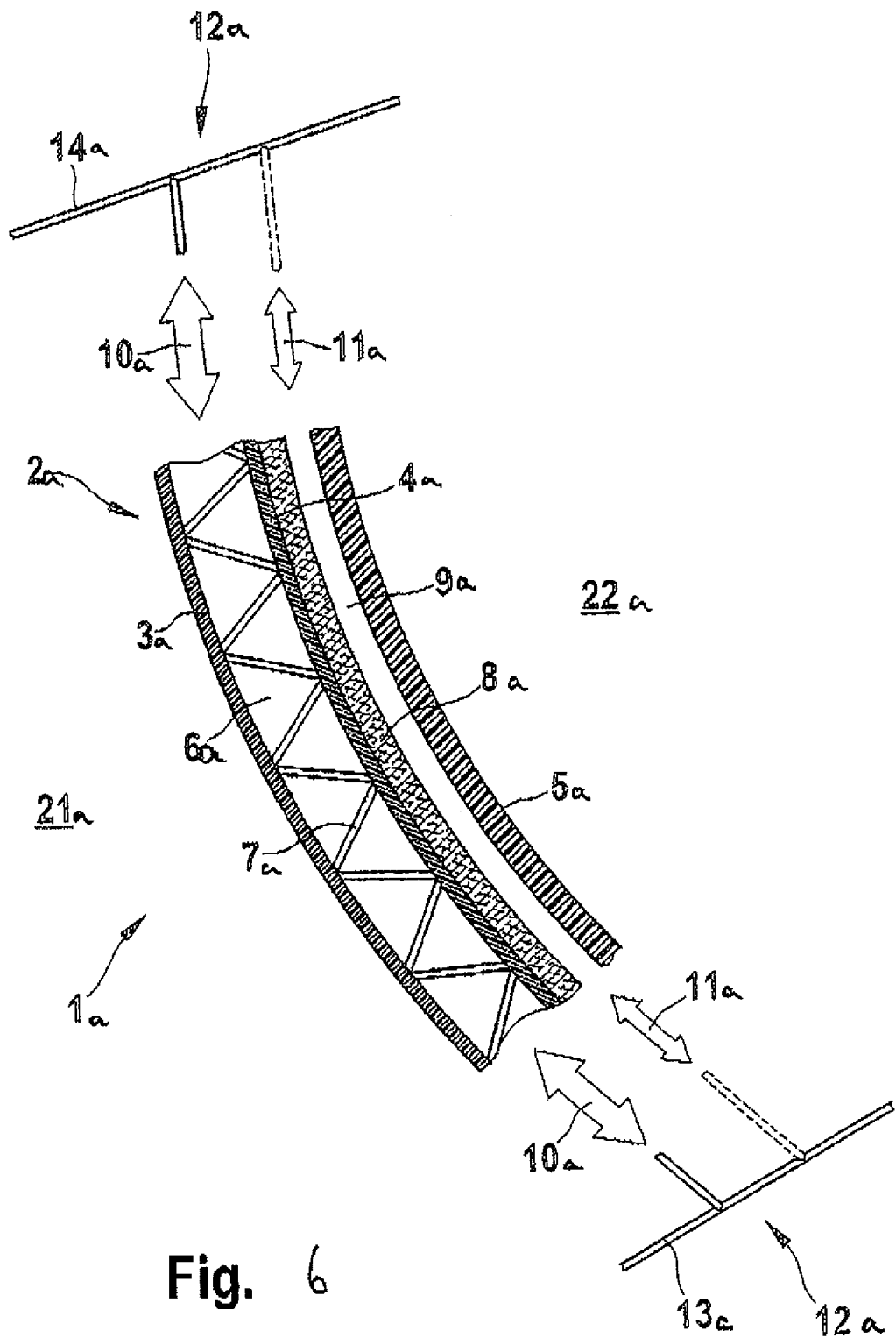
FIG. 6 shows a partial sectional view of a portion of a further exemplary embodiment of a fuselage according to the invention.

FIG. 6 shows a further exemplary embodiment of the fuselage 1a according to the invention, which differs from the second exemplary embodiment according to FIG. 5 firstly in that only the core interspace 6a forms the Z lines 15a of the system of pipes 12a. However, the interspace 9a is subjected to a secondary air stream 11a, which serves for admitting air to the area behind the structural element 5a, that is to say the interspace 9a. This secondary air stream 11a can also be used for active insulation. This is to some extent easy, since the installation for this secondary air stream 11a is often present. By for example increasing the mass throughput of this secondary air stream 11a, the active insulation brought about by it in this example is increased.

To improve the insulation further, in this example an insulating element 8a has been additionally applied on the inner side of the inner shell element 4a in the interspace 9a. In this arrangement given by way of example, the insulating element 8a in this way forms a passive insulation in combination with the active insulation by means of the secondary air stream 11a through the interspace and the air stream 10a through the core interspace 6a. However, an integration of portions of the system of pipes 12a of the air-conditioning system, an integration of Z lines 15a and a connection configured in the way described above are only possible in conjunction with the core interspace 6a.

The respective connections between the existing system of pipes 12a of the air-conditioning system and the interspaces 6a; 9a are created by a known installation technique for systems of pipes of air-conditioning systems for aircraft or spacecraft. For example, the common lower X line 13a in the form of a pipeline, for example of a rectangular or circular cross section, serves as a manifold from which connections are connected as branches for each interspace or for groups of interspaces. These connections may be designed for example in such a way that they are adapted in a suitable way from the cross section of the manifold to the cross section of the opening into the respective interspace. Connections of the interspaces 6a; 9a to the upper X line 14a and the intermediate lines 16a are formed in an analogous way.

The invention is not restricted to the exemplary embodiments described above.

For instance, the invention can be used in the case of fuselages of a single- or double- or multi-shell configuration, the shell elements being formed from metal, fibre composite materials or a combination of metal with fibre composite materials.

It is also conceivable that the air stream 10 can not only be heated but also be cooled. This could be the case, for example, if one side of the fuselage 1 is exposed to high thermal radiation, as may be the case for example with spacecraft. The other side of the fuselage then requires heating by the air stream, while the irradiated side requires cooling. This is possible for example by corresponding arrangement and switching of the valves 13; 14 and different heat exchangers of the air-conditioning system.

Dividing the integrated portions into the interspaces 9a and 6a is also conceivable. In this case, these portions, which are therefore separate, can be heated, cooled, provided with air or switched off independently of each other, which is possible for example by means of suitable control valves.

In addition, it is pointed out that "a" does not rule out a multiplicity. Furthermore, it should be pointed out that features or steps that have been described with reference to an exemplary embodiment can also be used in combination with other features or steps of other exemplary embodiments or developments that are described.

The invention claimed is:

1. A fuselage of an aircraft or spacecraft, with at least one shell element and a structural element, an interspace to which air is admitted by an air stream being provided between the at least one shell element and the structural element, wherein the air-admitting air stream is formed as an outgoing air stream of a pressurized interior space of the fuselage including a cabin and the air-admitting air stream is an active insulation of the interspace, the interspace is connected to a corresponding outgoing air connection of the interior space, through which air connection the air-admitting air stream flows out of the interior space into the interspace, wherein the air connection comprises a valve through which the air stream out of the interior space into the interspace is adjustable, and wherein the interspace forms at least a portion of a line of a system of pipes of an air-conditioning system, which adjusts or regulates the internal cabin pressure.

2. The fuselage according to claim 1, wherein the at least one shell element is of a multi-part form and has an outer shell element and an inner shell element, the interspace to which air can be admitted by the air stream and which forms at least a portion of the system of pipes of the air-conditioning system, being provided between the inner shell element and the structural element.

3. The fuselage according to claim 1, wherein the at least one shell element is of a multi-part form and has an outer shell element and an inner shell element, which define a core interspace to which air can be admitted by the air stream and which forms at least a portion of the system of pipes of the air-conditioning system.

4. The fuselage according to claim 3, wherein air can be admitted to the interspace and the core interspace by the air stream at the same time, the interspace and the core interspace forming separate portions of the system of pipes of the air-conditioning system.

5. The fuselage according to claim 4, wherein the core interspace forms portions of the system of pipes of the air-conditioning system and air can be admitted to the interspace by a secondary air stream.

6. The fuselage according to claim 1, wherein the at least one shell element is provided with an insulating element.

7. The fuselage according to claim 1, wherein the structural element has insulating properties.

8. The fuselage according to claim 1, wherein the valve is formed as a regulating valve.

9. The fuselage according to claim 1, wherein the valve is formed for at least partially regulating an internal pressure of the pressurized interior space.

10. The fuselage according to claim 1, wherein the at least one shell element is formed from metal, fibre composite materials or a combination of metal with fibre composite materials.

11. An aircraft or spacecraft with a fuselage which is formed according to claim 1.

12. A method of actively insulating a fuselage of an aircraft or spacecraft, comprising providing the fuselage, with at least one shell element and a structural element, an interspace to which air is admitted by an air stream being provided between the at least one shell element and the structural element, wherein the air-admitting air stream is formed as an outgoing air stream of a pressurized interior space of the fuselage including a cabin and the air-admitting air stream is an active insulation of the interspace, the interspace is connected to a corresponding outgoing air connection of the interior space, through which air connection the air-admitting air stream flows out of the interior space into the interspace, wherein the air connection comprises a valve through which the air stream out of the interior space into the interspace is adjustable, and wherein the interspace forms at least a portion of a line of a system of pipes of an air-conditioning system, which adjusts or regulates the internal cabin pressure, wherein the active insulation is carried out with the air stream which is the outgoing air stream of the pressurized interior space of the fuselage.

* * * * *